United States Patent [19]
Aharon et al.

[11] Patent Number: 6,006,028
[45] Date of Patent: Dec. 21, 1999

[54] TEST PROGRAM GENERATOR

[75] Inventors: Aharon Aharon, DN Misgav; Yossi Malka, Haifa; Yossi Lichtenstein, Ramat-Gan, all of Israel

[73] Assignee: International Business Machines Corporation, Armonk, N.Y.

[21] Appl. No.: 08/245,179

[22] Filed: May 17, 1994

[30] Foreign Application Priority Data

May 18, 1993 [GB] United Kingdom ................... 9310223

[51] Int. Cl.⁶ .................................................. G06F 17/30
[52] U.S. Cl. .................. 395/500.42; 395/701; 707/100; 364/489
[58] Field of Search ................................... 395/700, 600, 395/500, 650, 75, 76, 50, 500.42, 701; 371/15.1, 22.1; 364/489, 490, 513

[56] References Cited

U.S. PATENT DOCUMENTS

| | | | |
|---|---|---|---|
| 4,922,432 | 5/1990 | Kobayashi et al. | 364/490 |
| 4,924,408 | 5/1990 | Highland | 364/513 |
| 5,197,016 | 3/1993 | Sugimoto et al. | 364/490 |
| 5,276,881 | 1/1994 | Chan et al. | 395/700 |
| 5,347,614 | 9/1994 | Yamada et al. | 395/75 |
| 5,359,539 | 10/1994 | Mitsumoto et al. | 364/489 |
| 5,381,417 | 1/1995 | Loopik et al. | 371/15.1 |
| 5,394,347 | 2/1995 | Kita et al. | 364/578 |
| 5,448,740 | 9/1995 | Kiri et al. | 395/700 |
| 5,488,573 | 1/1996 | Brown et al. | 395/500.42 |

FOREIGN PATENT DOCUMENTS

0413133A2  2/1991  European Pat. Off. .

OTHER PUBLICATIONS

Fourth International Conference on Industrial & Engineering Applications of Artificial Intelligence & Expert Systems; Jun. 2–5, 1991; pp. 99–104; Dingankar, et al.; "VLSI Logic Verification Program Generator."

MIDCON/88 Conference Record, Dallas, TX; Aug. 30–Sep. 1, 1988; pp. 70–73; Rim et al.; "Rule–Based Evaluation Methodology of Multi–Cache System."

Allred et al.; "Agatha: An Integrated Expert System to Test and Diagnose Complex PC Boards."

IBM Systems Journal, 1991; vol. 30, No. 4, pp. 527–538; Aharon et al.; "Verification of the IBM RISC System/6000 by a Dynamic Biased Pseudo–Random Test Program Generator."

Primary Examiner—Paul R. Lintz
Attorney, Agent, or Firm—Steven W. Roth

[57] ABSTRACT

An architecture-independent test program generator for producing test programs for checking the operation of a hardware processor design comprises means for storing data representing the processor instruction set and resources, and logic for generating, for subsequent storage or processing, test programs from said stored data, characterized in that the data is a separate declarative specification, the generator comprising logic for extracting said data from the storage means, and in that the relationships between the processor resources and semantic entities associated with each instruction are modelled in said declarative specification.

15 Claims, 6 Drawing Sheets

TEST PROGRAM GENERATOR

FIELD OF THE INVENTION

The invention relates to a test program generator for generating programs for use in checking hardware processor designs for computers.

BACKGROUND OF THE INVENTION

The goal of processor verification is to ensure equivalence of a processor and its architectural specification. This goal can be achieved either by a formal proof or by exhaustive simulation. However, the complexity of processors renders the formal approach impractical for most industrial applications and the size of the test space makes exhaustive simulation impossible.

Typically, the architecture specification is an informal description of the processor's resources, the instruction repertoire and the effect of instruction execution on the processor state. It also describes the main hardware mechanisms such as address translation, interrupt handling or multi-tasking. Computer architectures are complex. A typical architecture includes hundreds of instructions; a few dozens of resources, such as main memory, general-purpose registers, special-purpose registers, and complex functional units, e.g. floating point, address translation, external interrupt mechanism. A typical architecture description is a few hundred pages long.

In practice, design verification of hardware processors is generally, but not exclusively, carried out by simulating the operation of sets of assembly level test programs using a hardware simulator with a particular set of design parameters and comparing the results with the output predicted by a behavioral simulator.

The hardware simulator may take as input a design model written in a hardware description language, such as the IEEE standard VHDL (IEEE standard 1076-1987). Of course, if prototype hardware is available the test programs may be run directly on that. The behavioral simulator is normally written for software development purposes prior to having the actual hardware and represents the expected behavior of the hardware given the architecture specification.

Traditionally, these test programs are written manually. First, a list of test requirements is compiled; then tests are written to cover this list. Requirements derived from the architecture specification usually call for the testing of every instruction, under normal, boundary and exception conditions. The tests written to satisfy these requirements are called Architecture Verification Programs (AVP), and are required to run correctly on any realization of the architecture. The design work-book, which defines major design details, such as clock cycle and cache size, and the actual HDL design are used to construct a second list of requirements and the Implementation Verification Programs (IVP). The latter typically test the functionality of caches, pipelines and units like a Carry Look Ahead adder or a bit-rotator.

Design verification by manually written tests is not cost effective. Using this approach a substantial proportion of the processor design effort must be dedicated to verification. Furthermore, many of these tests are too simple, as test engineers find it difficult to define complex situations.

The automatic generation of such test programs for the verification of processor architectures is known from A. Aharon, et al. 'Verification of the IBM RISC System/6000 By a Dynamic Biased Pseudo-Random Test Program Generator', IBM Systems Journal, April 1991 referred to hereinafter as R11 and from EP-A-453394. The automation of test program generation has increased productivity and in recent years has also provided better quality.

Typically, such a test program generator is a complex software system. An example described in R1 written in the programming language 'C' spans about 150,000 lines of code. The complexity of processor architectures, which nowadays can include hundreds of instructions and around ten functional units, and their informal description are reflected in the complexity of the test generation system.

These known test program generators suffer from the drawback that a new test program generator has to be developed and implemented for each architecture for which the process is to be used. In other words, the generator is architecture dependent.

Furthermore, changes in the architecture or in the testing requirements require subtle modifications to be made to the generator's code. Since design verification gets under way when the architecture is still evolving, a typical test generation system undergoes frequent changes.

Typically, there are two levels of changes: within an architecture version and between versions. Within a version there are normally hundreds of changes, many of them subtle. When the architecture is relatively stable, an architecture version is declared. It may be substantially different from the previous version. The changes in both levels are described informally, are often difficult to identify, and their consequences for the test program generator are not always clear. Furthermore, many of the changes required in the test generator are due to the evolving testing knowledge accumulated through the validation process itself. New testing needs rise frequently as a consequence of previous testing results and uncovering of design errors.

In the prior art, features of the architecture and knowledge gained from testing are modelled in the generation system. The architecture is needed to generate legal instructions and tests. Testing knowledge is used to generate interesting, smart or revealing instructions and tests. This knowledge is embedded in the generation procedures of the prior art systems. Modelling of both architecture and testing knowledge is procedural and tightly interconnected. Its visibility is thus low. This worsens the effects of the complexity and changeability.

SUMMARY OF THE INVENTION

The present invention seeks to improve upon the known state of the art by providing a test program generator which is architecture independent. This is achieved in part by separating the knowledge from the control. In other words an architecture-independent generator is used which extracts data stored as a separate declarative specification in which the processor architecture is appropriately modelled.

However, formulating an appropriate external architectural model is not easy. One way of doing so would be to let the model follow the syntax of the instructions specified by the architecture. This level of modelling does not include enough information to enable useful or revealing test programs to be generated. The other extreme would be to model the complete semantics of the architecture including the effect of execution of instructions as found in an architectural simulator. This level of modelling is extremely complex and a generator which can use this level of detail would be extremely difficult to implement.

According to the invention a test program generator is provided for producing test programs for checking the operation of a hardware processor design, comprising means for storing data representing the processor instruction set and resources, and logic for generating, for subsequent storage or processing, test programs from said stored data, characterized in that the data is a separate declarative specification, the generator comprising logic for extracting said data from the storage means, and in that the relationships between semantic entities associated with each instruction and/or between said semantic entities and the processor resources are modelled in said declarative specification.

A model of the relationships between semantic entities associated with an instruction includes a precise definition of the relationship between semantic entities without having to describe the effect of executing that instruction. This may be done in two parts—a definition of the semantic entities and a description of the relationship between the entities. There is no need to include a description of the effect of execution of the instruction on the entities.

The inventors have found that modelling in this way gives enough power to generate useful test programs whilst at the same time keeping the complexity of the generator and the model reasonable and the computing time needed for test program generation within reasonable limits.

Thus, the invention provides an architecture independent test generator and the external architectural model that drives it.

The separate declarative specification is preferably in the form of a database external to the generating logic, but could, for example, reside on internal files of the system and still be separate from the generator and declarative, ie not a set of procedures but a set of data structures.

In one embodiment, in the separate declarative specification, the representation of each instruction is stored in the form of a tree structure, the first level of the tree comprising the syntax of the instruction and the last level of the tree comprising the possible values of and the relations between the semantic entities. In this case the generator comprises means for generating instances of the instruction and means for traversing the tree structure in a depth first order and generating an instance of each semantic entity in accordance with the choices made at previous traversal steps and to keep the consistency of the instruction instances. In other words, consistency is achieved by committing to decisions made at an earlier stage of tree traversal.

Preferably, testing knowledge relevant to the generation of useful test programs is modelled in the stored data. This is achieved through procedural modelling in a preferred embodiment by the means for generating the semantic entity instances comprising generation functions which are defined before the generation process, the generation functions being tailorable by the user so that desired types of test cases can be generated.

The generator can also, advantageously, comprise means for testing generated semantic entity instances in accordance with one or more validation criteria, which can also be tailorable by the user, the generation of the semantic entity instances being repeated if the generated instance does not satisfy the, or each, validation criteria.

In such embodiments, the users who populate the external database can then write generation and validation functions to embody their evolving testing knowledge, and to generate desired types of test programs.

Viewed from another aspect, the invention enables a method to be provided for producing such test programs, the method comprising: storing data representing the processor instruction set and resources in a separate declarative specification in which declarative specification the relationships between semantic entities associated with each instruction and/or between said semantic entities and the processor resources are modelled; extracting said data from storage; and generating test programs from said extracted data.

The invention removes the need to reimplement a generator for each architecture as testing requirements evolve. Thus it greatly reduces the cost of developing a generator for a new architecture. As the model is external to the generator, the effort required to introduce changes to the architecture or the testing knowledge is also reduced.

The architecture-independent generation process may be viewed as an interpreter of the external database. The complexity problem of the prior art is thus lessened by the strong separation between database and control. Furthermore, keeping the architectural simulator separate from the generator removes a major source of system's complexity. The invisibility is decreased by the formal and declarative modelling of the architecture and the testing knowledge. Confining most changes to the database considerably alleviates the changeability problem.

The external database serves as a heuristic knowledge base by representing testing knowledge, the heuristics representing the expertise of testing engineers. The model allows experts to add knowledge in a local and relatively simple way. It enables the cumulative experience of users to be incorporated into the system, and enables the generator to follow the progress of the testing process. The model-based test-generation approach allows this incorporation of complex testing knowledge into the systems. The model can thus be used both for defining the architecture and describing ways of generating important test-cases. Furthermore, it allows migration of testing knowledge from one architecture and design to another.

The approach of the present invention has the further advantages that it can be utilized at an early stage of processor development, when only parts of the design are available and that the generation technique and the modelling can be used in developing generators for non-traditional processors such as graphic engines and I/O controllers.

BRIEF DESCRIPTION OF THE DRAWINGS

An embodiment of the invention will now be described, with reference to the accompanying drawings, wherein.

DETAILED DESCRIPTION

Figure 1:
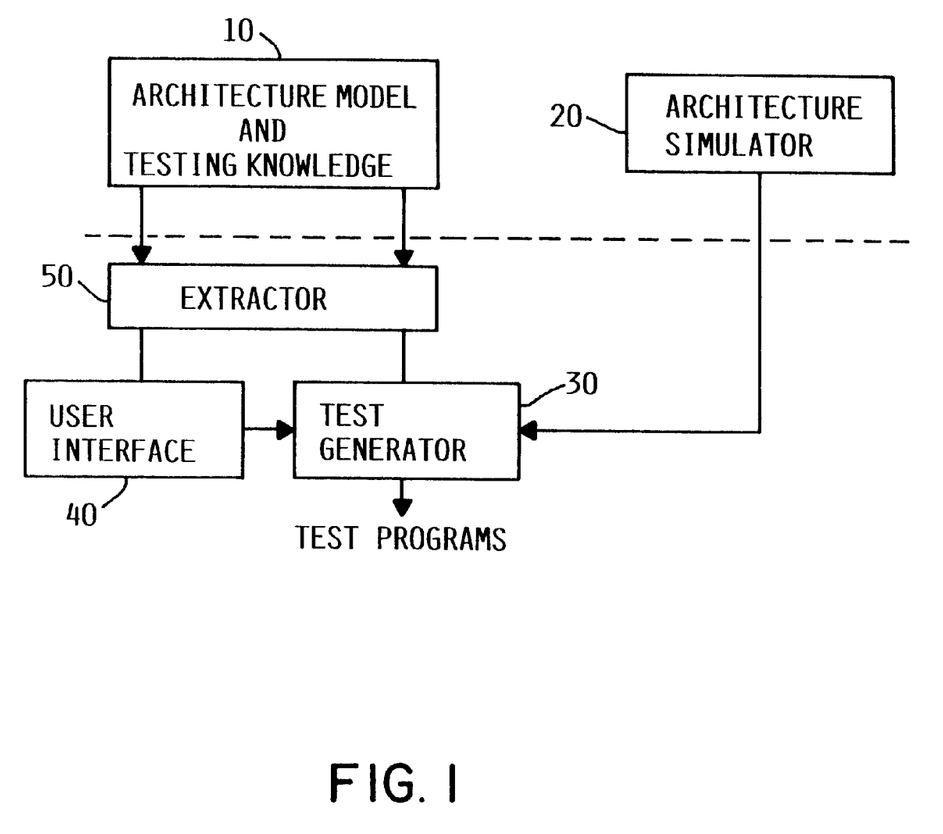
FIG. 1 is a schematic diagram showing the system components and interrelations.

Referring to FIG. 1, the system comprises an architectural model 10, architecture simulator 20, architecture independent generator 30 and user-interface 40. The generator 30 and user-interface 40 have been implemented in C, each spanning about 30,000 lines of code.

Figure 2:
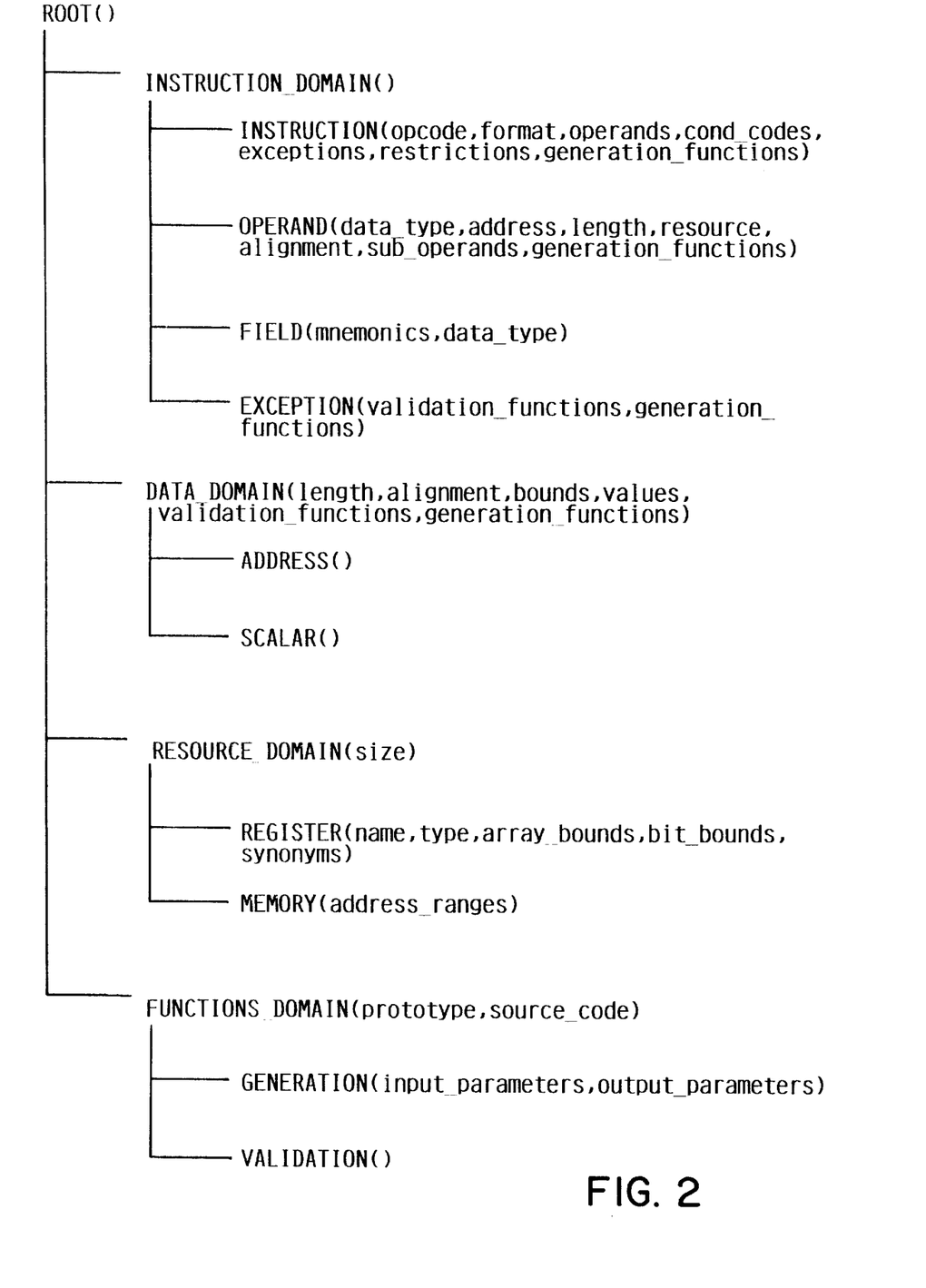
FIG. 2 shows a class hierarchy skeleton.

The architecture model 10 contains a specification of instructions, resources and data types as defined below. This information is stored in an object-oriented database for which a hierarchy of classes has been designed. Classes for instructions, operands, fields, resources, data types, generation and validation functions are defined. The attributes defined for a class hold the data for each object and the relation between objects of different classes. Generation and validation functions written in C embody procedural aspects of the architecture and testing knowledge; they are a part of the class hierarchy. In addition to the functions and instruction trees described below representing operands and fields of the instructions, some other architectural aspects are modelled in the database. A skeleton of the class hierarchy of the database is shown in FIG. 2.

The definition of generation functions allows the incorporation of testing knowledge into the model and user control over the application of testing knowledge during the generation process. A generation function object includes a specification of the input and output parameters of the function. A combination of values for input parameters corresponds to elements of the testing knowledge the function represents.

The population of the database can, for example, be carried out by a person familiar with the specific architecture. The informal architecture specification is used as a source for the architecture model. The testing knowledge could, for example, be either written by the database maintainer or by experienced test engineers who are familiar with the modelling scheme.

The data required by the user interface and the test generator is retrieved by an extraction program 50. The extractor 50 transforms the data into internal data structures used by the generator and user interface. In addition, it checks the validity of the database and reports missing or inconsistent data. This report is used by the database maintainer while populating the database.

The system uses an appropriate separate architecture simulator 20. Such a simulator is generally designed for software development before the processor is available in hardware. For example, the simulator is used in the development of the operating system and language compilers. Such an architectural simulator typically spans 20,000–50,000 lines of high level language code. The interface between the simulator and the generator consists of procedures for accessing registers and memory; procedures for executing a single instruction and providing a list of resources that have been thus modified; and a capability to undo the effects of the execution of an instruction.

The Motif-based user interface 40 enables a user to have extensive control over the generation process. Apart from the ability to determine the number of instructions in each test and to initialize resources, the user can direct the generation at three levels: Global, Local and Specific. These levels are characterized by the scope of the control they offer. Global selections pertain to the generation process as a whole; local selections apply to every instance of an instruction whenever it is generated; finally, at the specific level selections bear on particular instances of generated instructions.

The generator 30 interprets many user directives as selection of generation functions and values for their input parameters. In this manner, the user controls the generation functions invoked in the Generate procedure described below.

At the global level, the user can select resource allocation policies, mark the instructions to be generated, enable selected interrupts and assign generation functions to data types to be used whenever a datum is needed. At the local level, the user is offered many semantic selections that follow the traversal of the instruction tree. At the instruction level these include interrupts, condition codes and generation functions for results of special interest; data and address generation functions are included at the operand level.

The specific level, constituting a special generation mode, enables the user to define a specific sequence of instructions-together with related selections. This sequence is to be followed by the generator to produce the corresponding test. A superset of the semantic selections of the local level is offered separately for each instruction in the sequence, including the setting of specific values to each operand's length, address or data instances. In addition, it is possible to make syntactic selections, assigning values to fields of the instruction. Using the specific level the user can actually write test scenarios leaving any desired amount of details unspecified, to be completed by the tool's randomness according to selections made at other levels.

The test generator 30 produces a test file containing a number of test programs. As described below, each program is generated separately, and uses a single-instruction generator repeatedly. In addition generating a program involves a complex overall control and the use of several modules. For example:—User selections received from the user interface are imbedded into the data structures used by the instruction generator;—The architecture simulator is used to initialize resources, simulate instructions and obtain expected results;—A backtracking support mechanism is used to allow the program generator to ignore a generated instruction element;—A set of routines is available for the use of generation functions, obtaining information about the instruction being generated, making random selections, accessing architectural resources, etc.

Figure 3:
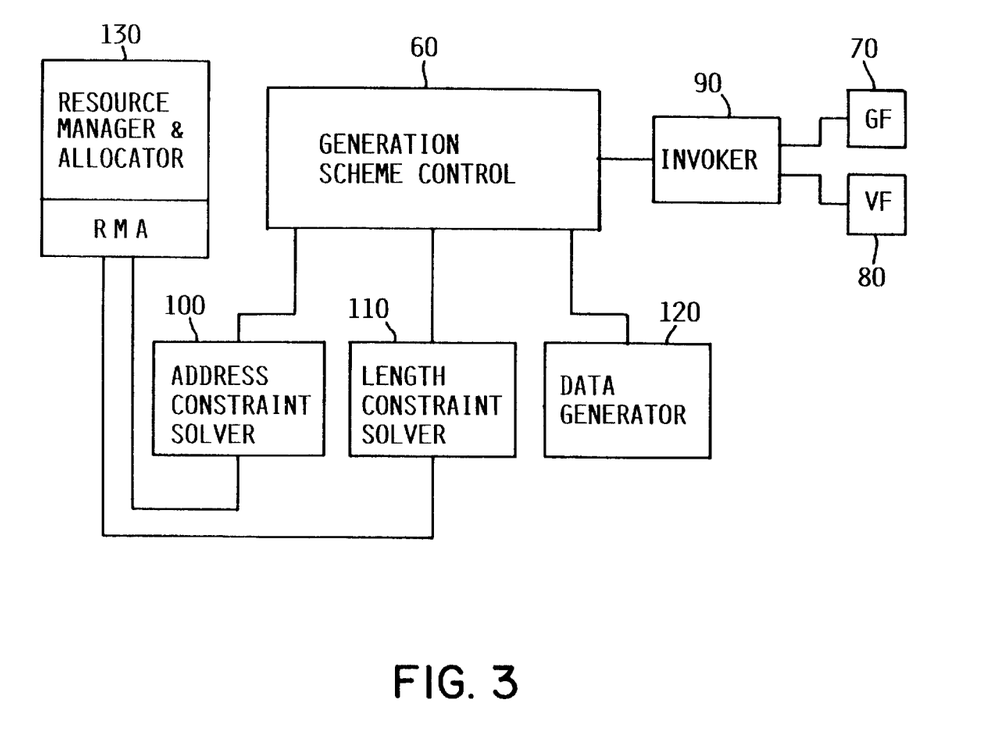
FIG. 3 is a schematic diagram showing the structure of the test generator.

FIG. 3. is a schematic diagram showing the structure of the test generator 30. It comprises generation scheme control logic 60. Generation functions and validation functions 80 are invoked by the generation scheme control logic 60 through an invoker 90. The generation scheme control comprises three constraint solvers: one for address 100, one for length 110 and one for data. Since the data constraints are trivial, this data constraint solver is designated a data generator 120.

Resource manager and allocator 130 is responsible for keeping track of the state of resources and their allocation. It comprises three main components as shown in FIG. 3—register modelling R, memory modelling M and attribute mechanism A. The address and length constraint solvers 100 and 110 communicate with the resource manager 130.

The operation of the resource manager and the constraint solvers are described below.

The resource manager maintains the information about registers and memory. This information, in conjunction with allocation policies, which can be user-specified or internal, is used in the allocation of resources.

The resource manager 130 holds static as well as dynamic information. For registers, static information includes the spatial relations between registers ie a register may be a synonym of a part of another register, and the allocation policy selected by the user, eg use-new-registers or use-a-register-that-was-a-target-in-the-last-instruction. The dynamic information kept for registers is a set of attributes representing the usage of the register, eg initialized, target-in-last-instruction, result. Both static and dynamic information is used by the register allocator to put into effect the desired policy when replying to requests for register allocation. The instruction generator may request to use a single register or an array of registers.

Memory is characterized by the address ranges allowed for instructions and data, and by the selected memory allocation policy, eg NEW, USED-IN-RECENT-ACCESSES. Dynamically, information is kept about the usage of memory in the test program, taking into account the huge size of memory that may be involved.

Answering the memory allocation requests made by the generator, several characteristics of the desired memory segment must be taken into consideration: the length required, type of memory, intended use, ie source or target, an alignment requirement and complex restrictions in particular a request for a range relative to a given base address.

Great importance is attributed to the efficiency of automatic test generation. Therefore, measures have been taken in the design of the instruction generator in order to make it efficient. Constraint solvers are used to avoid superfluous backtracking, due to violation of relations between values of leaves in the instruction tree as specified by length and address expressions. A solver is activated at appropriate internal nodes of the instruction tree and simultaneously assigns values to the leaves such that the relations are not violated.

Each of the solvers is specialized in solving a particular subset of the expression languages. A solver must cope with relevant user selections, the state of the machine and data from the model of the architecture. For example, solving the expression ADDRESS=CONTENTS(REGISTER(B2))+ VALUE(D2) (in the Add-Word instruction tree described below) involves selecting a register index, contents for that register, the displacement field, such that the above address expression is satisfied. This solver takes into account user selections of syntactic nature, ie values for the displacement and register index fields, and selections of semantic nature, ie the address and the data that should reside there. Furthermore, the solver must consider the state of the resources involved (a register and a memory location), and the definition of the displacement data-type.

Verification Tasks

Verification tasks are described using terms from two domains. The first is the domain of operands, instructions and sequences of instructions called the operation domain. The hardware domain is that of hardware facilities including resources and functional units, eg registers, memory, Address Translation, cache, pipeline. Some tasks specify attributes or instances of elements in the operation domain; others associate between resources or special events related to functional units and elements of the operation domain as shown below. Verification task descriptions use enumeration and combination as basic operators on sub-tasks. For example, a sub-task may be an alignment requirement, while a combination may be an alignment requirement for both operands, and enumeration may require all alignments for an operand to be tested. The discussion below is sectioned according to the elements of the operation domain in the following order: operands, instructions, sequences of instructions.

Operand tasks are related to the data, address or length of the operand. This is exemplified by the following tasks: * Use all possible lengths of an operand; * Access an operand address that is either aligned to or crosses a page boundary; * Access an operand address such that a page fault occurs; * Access an operand address such that a cache hit occurs; * Access an operand that ends on a cache line end, such that a cache miss occurs; * Use specific data values (e.g., ZERO,MINIMUM,MAXIMUM); * Use invalid data values causing exceptions (e.g., non-decimal digit in a decimal operand).

Instruction tasks are characterized as specifying operand combinations. The specification may be implicit, describing a set of combinations or explicit, imposing restrictions on each of the operands.

Implicit specifications are related either to exceptional conditions caused by the execution of an instruction or to results of special importance it computes. An exception often results in a program interrupt; some results cause Condition Code bits to be set. Consequently, verification tasks of instructions are mostly related to exceptions, condition codes and other special results, requiring the occurrence of these events.

Moreover, the set of instruction verification tasks is partitioned into the so called exception-path and non-exception-path sub-sets. Examples of such tasks are:

Cause a division by zero exception;

Cause an illegal storage operand overlap exception;

Set every condition code bit;

Compute result equal to the MAXIMAL possible value (no exception or condition code set).

Explicit specifications of the relation between the operands are mainly derived from two sources: the relation between the instruction components and the hardware domain, and the semantics of the operator the instruction embodies. Examples of such specifications are:

Use given pairs of values for the data of the operands;

Use a value of one for the divisor on a divide instruction;

Use all alignment combinations of two operands;

Use specific operand length relations (e.g., L1>L2, L1=L2);

Use specific operand length relations and various data values, eg L1>L2 and the data of the first operand smaller than that of the second operand;

Use operands that overlap, ie have some storage in common, on a certain storage partition boundary.

Sequence verification tasks typically specify a short sequence of two or three instructions. Although a task may specify as little as the instructions involved, it may require a deeper relation between the instructions.

Such a relation originates from hardware domain elements executing instructions in parallel eg pipeline mechanism, or multiple computation units. Often, these tasks require that resources are shared between operations executed in parallel. For example, floating point instructions may be executed concurrently with other instructions; a floating point instruction that uses the ALU may be executed in parallel to another floating point instruction that does not use it.

The following exemplifies sequences of size two— ('inst1','inst2'):

Every instruction followed by any other instruction;

Load a register in 'inst1' and then use its value to access storage in 'inst2';

Both 'inst1' and 'inst2' are floating point instructions using a single ALU;

'inst1' ends on a page boundary and the next page is non-resident ie pre-fetching 'inst2' yields a page fault;

'inst2' is a branch instruction and 'inst1' causes conditions that perturb the timing of the execution of the branch.

Short sequences encapsulate a short interdependency chain between instructions. Long sequence verification tasks can be classified according to the length of the interdependency chains they require. Long sequences with short interdependency chains are actually an extension of the short sequences described above, and thus serve only as a mix of these verification tasks. Long sequences with a long interdependency chain are required for complex verification tasks. Such tasks are related to Input/Output, multi-tasking, etc., and are considered to be a separate class of tasks. For example, an I/O verification task would consist of instructions to initialize the operation, the I/O instruction itself and a delay to allow the operation to complete before the contents of the facilities involved can be inspected.

Test programs can be classified according to the complexity of the interdependencies imbedded in them. These dependencies can be ordered in increasing complexity as follows: within-operand, inter-operand and inter-instruction. The latter can in turn be ordered as short and long sequences. Thus, considering testing knowledge, the complexity of the dependencies included in a test determines the complexity of the test itself.

The verification tasks described above indicate that it is necessary to model resources and instructions. Many of the verification tasks use terms as the address of the operand and terms related to different aspects the computation carried out by the instruction. Therefore, an instruction must be modelled semantically rather than syntactically.

The tasks also unveil important attributes of elements of the operation domain. For example, length, address and data are important for operands; exceptions, condition codes and special results are pertinent to instructions. Also, the notion of a data-type for the data values an operand can take is implied.

The verification tasks are defined to test the different notable cases from the architecture book. The modelling allows sufficient expressibility to support the testing of a diverse set of such cases. Thus, considering the verification task description to be testing knowledge, it is modelled to allow an open knowledge base. Furthermore, the testing knowledge is complex and procedural, thus there is a trade-off between the openness and the simplicity of the solution, which limits the expressiveness of the testing knowledge to some extent.

BASIC MODELLING AND GENERATION

Test programs are sequences of instruction instances which use the architecture resources. This section describes the model of both resources and instructions and explains the basic generation scheme. The next section completes the modelling details and describes the full generation procedure. The model is depicted in an informal way; in particular, the semantics of the address, length and data expressions are described but not formally defined and the consistency of operand instances is explained but not defined. An elaborate example of an instruction model and the generation of an instruction instance is given in these two sections.

1. Resources

Memory and register resources are described by an ISPS memory declaration. Such declarations are described in M. R. Barbacci, An Introduction to Instruction-Set Processor Specification, in 'Computer Structures: Principles and Examples', by D. P. Siewiorek, C. G. Bell, A. Newell, McGraw-Hill, 1982. They include the memory name, the size of memory cells, and the range of addresses. Several memory resources are possible.

Definition: A 'resource' is a quintuple NAME í LOWER ADDRESS: UPPER ADDRESS I<LOWER-BIT: UPPER-BIT>.

An 'address' of the resource NAME is an integer in the range íLOWER-ADDRESS,UPPER-ADDRESSI.

For example, a main memory may be 248 addressable bytes: Main-Memoryí0x000000000000:0x FFFFFFFFFFFFI<0:7>.

Note that Ox prefices hexadecimal numbers, and that in IBM architectures bit indices are marked from left to right, e.g., 0 to 7. Word registers, as a second example, may be an array of sixteen four-bytes storage units: Word-Register í0:15I<0:31>.

Resources may overlap each other; this relation is considered part of the processor specification and is taken into account while testing the architecture. Following ISPS, resource overlapping is defined by a pair of resource declarations. For example, halfword registers may be defined over the word registers: Halfword-Register í0:15I<0:15>:=Word-Registerí0:15I<16:31>.

2. Instructions

Instructions are modelled as trees at the semantic level of the processor architecture. However, as this embodiment is targeted towards automatic test generation of Complex Instructions Sets Computers (CISC), further elaboration of the trees is needed. An instruction is described by a tree with a format and a semantic procedure at the root, operands and sub-operands as internal nodes and length, address and data expressions as leaves.

The following is an informal bottom up description of the instruction model. A set of unique literals (or identifiers) is assumed; literals are used as field and data-type names, as well as to denote field values.

Definitions: A 'field' is a triplet<NAME, VALUES, REGISTER>, where NAME is a literal (referred to as the field's name), VALUES is a set of literals, and REGISTER is either the reserved literal NONE or a register name (as defined above). A 'format' is a finite set of field names.

Using formats as alphabets, two languages representing the possible addresses and lengths of operands are defined as follows:

Definitions: An 'address expression' over a format F is described syntactically by the following grammar:

| (1) address-expression | := in-field(field-name1) ] |
|---|---|
| (2) | value(field-name1) ] |
| (3) | register(field-name2) ] |
| (4) | specific-register(register-name,integer) ] |
| (5) | contents(address-expression) ] |
| (6) | address-expression '+' address-expression. |

Restrictions:
 (1) field$_{name}$1, and field$_{name}$2 are in F;
 (2) for<field$_{name}$1, Values, Register>Register is NONE;
 (3) for<field$_{name}$2, Values, Register>Register is not NONE.
 (4) register-name is a resource name.

The semantic domain of address expressions consists of addresses as defined above. Rule (1) denotes data which resides directly in the corresponding field (also known as an immediate field). Rules (2) and (3) denotes the values of the corresponding fields: rule (2) denotes the field values which are interpreted as memory addresses. Rule (3) denotes the field values which are interpreted as registers. Rule (4) denotes a specific register, eg word register number 9 is denoted by specific-register(Word-Register,9). Rule (5) denotes the contents of the address indicated by the (inner) address-expression. The semantics of rule (6) is the standard one.

Definition: A 'length expression' over a format F is described syntactically by the following grammar:

| (1) length-expression | := integer ] |
|---|---|
| (2) | maximum(integer) ] |
| (3) | value(field-name1) ] |
| (4) | contents(address-expression) ] |
| (5) | length-expression '+' length-expression ] |
| (6) | length-expression '*' length-expression. |

Such that:

(1) field_name1 is in F;

(2) for<field_name1, Values, Register>Register is None;

The semantic domain of length expressions consists of the positive integers. The meaning of rules (1), (5) and (6) is the standard one. Rule (2) denotes any length smaller or equal to the given integer. Rule (3) denotes the values of the corresponding field. Rule (4) denotes the contents of the addresses denoted by the address-expression.

Definition: A 'data expression' is a literal denoting a data-type.

The semantic domain of data expressions is strings of data, in this embodiment either decimal or hexadecimal digits. A data-type describes such a set of data strings by their length, either fixed or variable under limits, and structure.

Address, length and data expressions collectively model the basic semantic entity of our model, the sub-operand. Sub-operanids are grouped into operands. Formats, semantic procedures and operands form the instruction model.

Definition: A 'sub-operand' over a format F is a triplet holding a length expression over F, an address expression over F and a data expression.

An 'operand' over format F is a finite set of sub-operands over F. A semantic procedure is a procedure which manipulates the architecture resources and represents the operation performed by the instruction. An 'instruction tree' is a triplet holding a format F, a semantic procedure, and a finite set of operands over F.

The semantic procedure is included here for the sake of completeness; in the actual system semantic procedures are part of a separate architecture level simulator. While sub-operands and operands represent the semantic entities, the semantic procedure represents the actual meaning of the instruction. The relation between operands are thus represented in two ways. Dynamic relations are a result of the instruction execution; they are modelled by the semantic procedure. Structural relations are modelled by address, length and data expressions. These relations have the characteristic that they exist prior to the execution of the instruction; thus they are central to the automatic generation of tests and are modelled declaratively.

Declarative modelling of the full semantics of instructions has been ruled out because of its complexity. Furthermore, the relationships between semantic entities are static (i.e., they do not change; they are the same before and after the execution of the instruction), while the semantics is dynamic (it must be defined in terms of 'before' and 'after' the instruction execution).

Modelling the full semantics would have made automatic generation too complex to be practical. The approach employed here gives enough power to generate useful and revealing test programs whilst at the same time keeping the complexity of the generator and the model reasonable and the time needed for generation revealing tests within acceptable limits.

The resulting instruction model is called an instruction tree, as it may be viewed as a four level tree. The root (first level) includes both the syntax of the instruction (format) and its semantics (semantic procedure). Internal nodes are the semantic constituents of the instruction—operands at the second level of the tree and sub-operands at the third level. The leaves describe the possible values of, as well as the relations between, the semantic entities. These leaves, ie Address, length and data expressions, constitute the fourth level of the tree.

3. Example

An ADD WORD Instruction Tree

Figure 4:
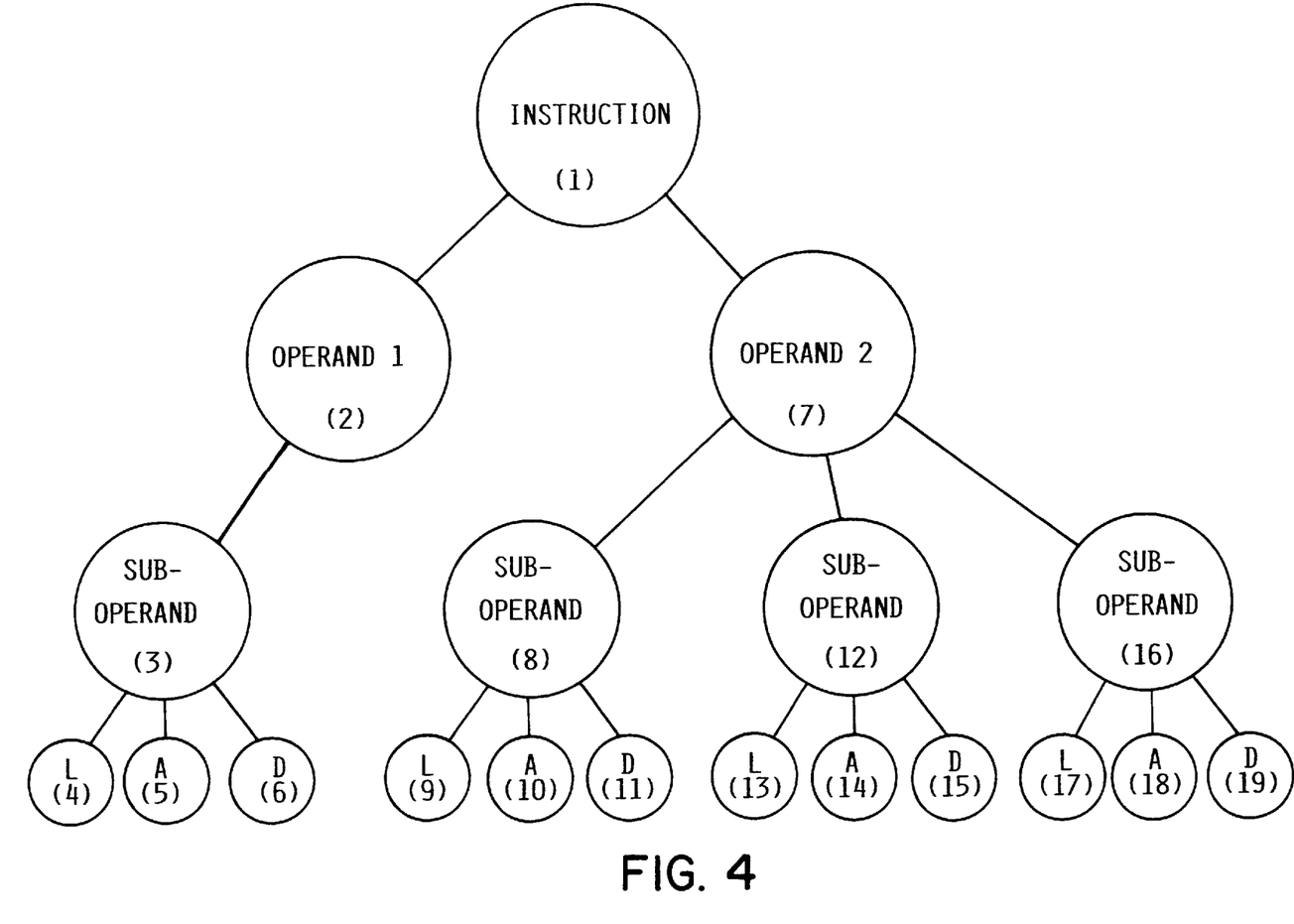
FIG. 4 shows an example of an ADD WORD instruction tree.

ADD WORD is one of the simplest instructions in a typical CISC architecture. Informally, the meaning of this instruction is to add the second operand to the first one and to place the sum at the first operanid's location. The instruction tree is depicted by FIG. 4. The resources assumed are a main memory, base-registers and word-registers.

Instruction:
 Semantic procedure: ADD-WORD( ).
 Format: AW-OPCODE W1, D2, B2.
Where the fields are:
 <AW-OPCODE, (AW), None>,
 <W1, (0,1,2, . . . ,E,F), Word-Register>,
 <D2, (00,01,02, . . . ,FE,FF), None>, and
 <B2, (0,1,2, . . . ,E,F), Base-Register>.
In this case the semantic entities are:

1. The Word-Register whose symbolic name for the purpose of describing this instruction is "W1". The possible values for "W1" are 1, 2, 3, . . . , 16.

By "Word-Register" is meant that there is a set of registers defined as part of the resources of the processor under consideration; every time we refer to this set (both while defining resources and instructions) we call them Word Registers. By the possible values for "W1" are 1, . . . , 16, is meant that there are 16 such registers, and an instance of the Add Word instruction must choose one of them.

Note that the name of the entity "W1" is taken from the syntax of the Add Word instruction, i.e., the format of the instruction.

2. The Base-Register whose symbolic name for the purpose of describing this instruction is "B2". The possible values for "B2" are 1, 2, 3, . . . , 16.

3. The field whose symbolic name for the purpose of describing this instruction is "D2". The possible values for "D2" 00, 01, 02, . . . , FF.

By "a field" is meant that there is no resource corresponding to this entity; an instance of the instruction Add Word includes a value (two hexadecimal digits between 00 and FF) associated with this field.

4. A word (4-bytes) in the memory. This entity is not directly named (i.e., there is no item in the format of the instruction which points to this entity).

The relationships between the semantic entities: Only one such relation exists in the Add Word: entity number 4 is related to entities 2 and 3 as follows: the memory word (which is entity 4) is pointed by the contents of entity 2 ("B2") plus the value of entity 3 ("D2").

In the Address-Expression this is expressed as follows:
 address$_{of\ entity}$4=contents(register(B2))+value(D2)

Note that this relationship exists before the execution of the instruction as well as after it.

The semantics of the Add Word instruction is not modelled declaratively. Its model is procedural as described in the semantic procedure ADD-WORD( ) mentioned in the instruction tree's root (as well as being part of the behavioral simulator). Had a declarative model of the semantics of the ADD-WORD instruction been included in the instruction tree, it could have been expressed as follows:

The contents of the memory word (entity number 4) after execution of instruction equals the sum of the value of that memory word before the execution of the instruction plus the contents of entity 1 ("W1"). The contents of all other entities do not change.

Note that even for the this simple example the seimantics is much more complex than the relationship between entities.

Thus the lower levels of the tree structure contain the following:

First operand: represents the storage used both as a source and target of the Add Word instruction.—Sub-operand: points to the register used as the first operand. * Length expression: 4 (i.e., a word—four bytes); * Address expression: register(W1) (i.e., the word register denoted by the field W1); * Data expression: Signed-Binary (i.e., data of the data type Signed-Binary).

Second operand: represents the storage used as a source of the Add Word instruction.—Sub-operand: represents the actual storage used as the second operand (other sub-operands are used in addressing this memory storage word): * Length expression: 4; * Address expression: contents(register(B2))+value(D2) (ie the memory location pointed to by the sum of the contents of a base register (denoted by the field B2) and a displacement (denoted by the field D2)); * Data expression: Signed-Binary.

Sub-operand: represents the offset used for addressing the second operand: * Length expression: 2; * Address expression: in-field(D2). * Data expression: Displacement-Data-Type.

Sub-operand: represents the base register used for addressing the second operand: * Length expression: 6; * Address expression: register(B2) (ie the base register denoted by the field B2); * Data expression: Address-Data-Type.

4. Example

A MOVE CHARACTER LONG Instruction Tree

To further illustrate the inter-operand relationships and the complexity of instructions, consider the MOVE CHARACTER LONG instruction which is a complex CISC instruction. Informally, the effect of this instruction is to place the contents of the second operand in the storage location of the first one. If the second operand is shorter then the first, the data of the third operand will be appended to fill in the storage of the first operand. The addresses and lengths of the first and second operands are given in storage locations. These indirection structures are pointed to by base registers and displacement fields. The instruction operation may be interrupted; if so, the address and length representing the partial operation will be recorded in the indirection structures. The resources assumed are a main memory, and base-registers.

* Instruction:
  - Semantic procedure: Move-Character-Long().
  - Format: MVCL-OPCODE D1,B1,D2,B2,I3.

-continued

* First operand:
  - Sub-operand:
    * Length expression : contents(contents(B1)+value(D1) );
    * Address expression: contents(contents(B1)+value(D1)+2 );
    * Data expression: Unsigned-Binary.
  - Sub-operand:
    * Length expression : 8;
    * Address expression: contents(B1)+value(D1);
    * Data expression: MVCL-Indirection-Data-Type.
  - Sub-operand:
    * Length expression : 2;
    * Address expression: in-field(D1);
    * Data expression: Displacement-Data-Type.
  - Sub-operand:
    * Length expression : 6 ;
    * Address expression: register(B1)
    * Data expression: Address- Data-Type.
* Second operand: similar to the first one, with B2 and D2
* Third operand:
  - Sub-operand:
    * Length expression : 1 ;
    * Address expression: in-field(I3);
    * Data expression: Unsigned- Binary.

Note that both length and address of the first sub-operand are related to the contents or data of the second sub-operand. The address of the second sub-operand is related to the data of the remaining sub-operands. MOVE CHARACTER LONG exemplifies a CISC instruction: its structure is relatively complex; some of its data obeys non-standard data-types (e.g., MVCL-Indirection-Data-Type); its execution may be long and is interruptible.

Both examples show that this modelling approach copes well with the complexity of the CISC repertoire. Clearly, the approach is suitable also for RISC architectures which involve lower instruction complexity.

5. Generation

An instruction tree describes a set of instruction instances. The length, address and data expressions of the model are replaced by length, address, and data instances to form an instruction instance. This replacement must be consistent with the relations described by the expressions. Namely, if fields and resources are shared by several sub-operands, the values selected for them must be identical. The following section describes consistent instances and the process of generating them from instruction trees.

Definitions: A 'field instance' of a field<NAME, VALUES,REGISTER> is a literal V, such that V is in VALUES. A 'format instance' of format<FIELD1, . . . ,.FIELDn>, is <INST1, . . . ,.INSTn>, such that for all i, INSTi is a field-instance of FIELDi.

Definitions: An 'address instance' of an Address Expression AE is a resource address in the semantics of AE. A length instance of a Length Expression LE is an integer in the semantics of LE. A data instance of a Data Expression DE is data of the data-type denoted by DE.

Definitions: A 'sub-operand instance' of the sub-operand <LE,AE,DE> is a triplet <LI,AI,DI>, such that LI is a Length Instance of LE, AI is an Address Instance of AE, and DI is a Data Instance of DE. An operand instance of the operand <SUB1, . . . ,.SUBn>, is <INST1, . . . ,.INSTn>, such that for all i, INSTi is a consistent sub-operand-instance of SUBi. An instruction instance of the instruction tree <FORMAT, SEMANTICS, OPERANDs> is a pair <FORMAT-INST, OPERAND-INSTs> such that FORMAT-INST is an instance of FORMAT and all OPERAND-INSTs are consistent instances of OPERANDs.

The instruction tree is traversed in a depth first order. At the root and internal nodes, no action is taken. At the leaves, length, address and data instances are either already set by previous selections or are randomly selected from the semantics of the corresponding expressions. This scheme ensures consistency of the generated instruction instances.

6. Example

An ADD WORD Instruction Instance

Figure 5:
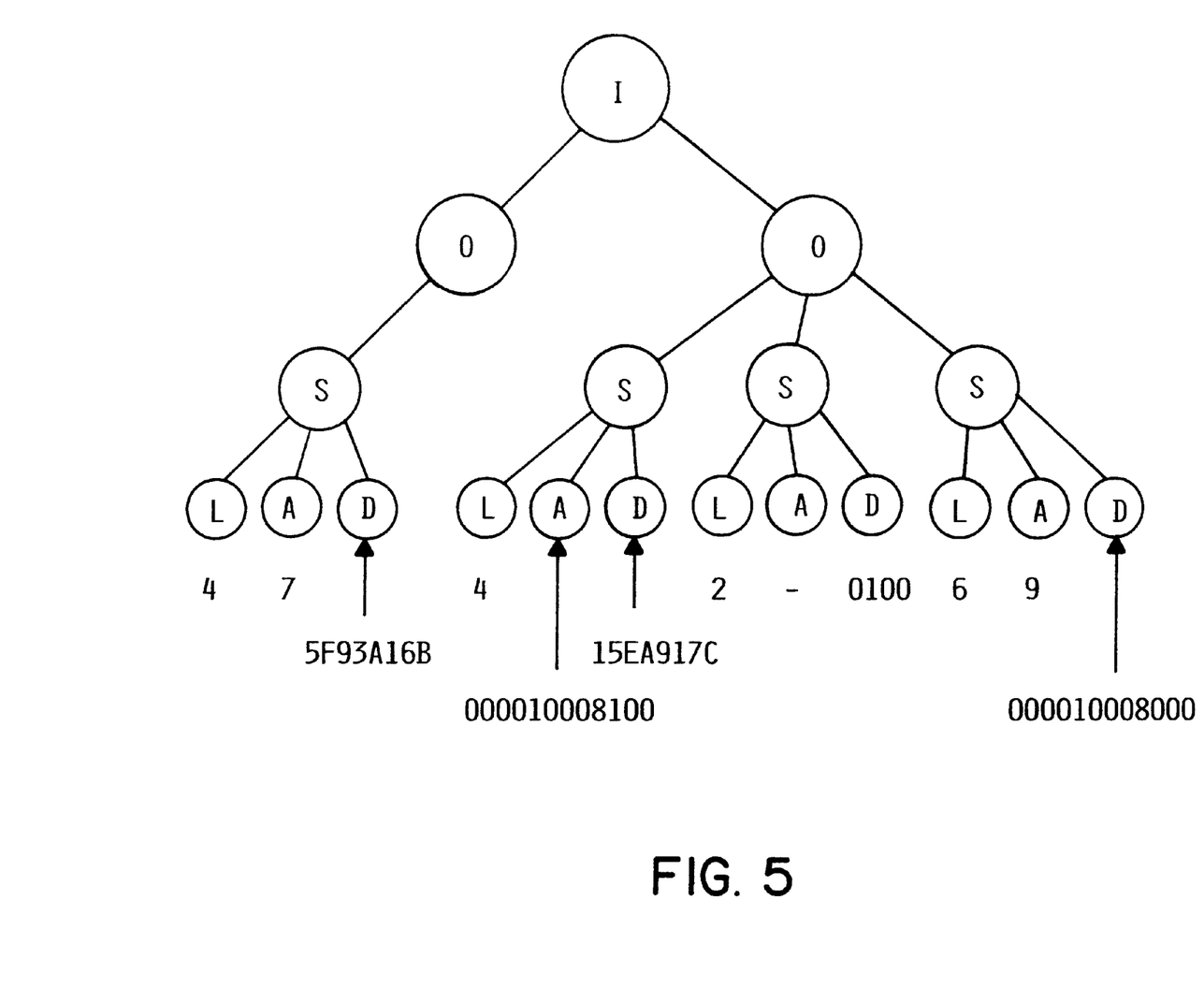
FIG. 5 shows an example of an ADD WORD instruction instance.

The instruction tree is traversed in depth first order. An instance of such an ADD WORD instruction is depicted by FIG. 5, in which the node labels denote the generation order, and the following list.

```
* Instruction instance:
* First operand:
  - Sub-operand instance:
    * Length instance: 4;
    * Address instance: 7 (i.e., word register number 7);
    * Data instance: 5F93A16B.
* Second operand instance:
  - Sub-operand instance:
    * Length instance : 4 ;
    * Address instance: 000010008100 (ie main memory address);
    * Data instance: 15EA917C. - Sub-operand instance:
    * Length instance : 2 ;
    * Address instance: none (as the data resides in the D2 field);
    * Data instance: 0100 .
  - Sub-operand instance:
    * Length instance : 6 ;
    * Address instance: 9 (ie base register number 9);
    * Data instance: 000010008000.
```

This instruction instance sets both the syntax and the semantic entities of the ADD WORD instruction. The syntax is a format instance (AW 7, 0100, 9). The semantic domain includes the contents of word register number 7 (5F93A16B), the contents of base register number 9, (000010008000), and the contents of the main memory word 000010008100 (15EA917C).

Further Modelling and Generation

The basic model described above lacks the ability to describe complex aspects of the architecture and to incorporate testing knowledge. Furthermore, the basic generation scheme does not clarify how consistency is kept in selecting length, address and data instances. The modelling and generation details which provide for these needs are described below.

1. Generation and Validation Functions

Generation and validation functions are used as basic blocks of the generation scheme. These functions implement a generate-and-test strategy alongside the traversal of instruction trees.

Definition: A 'Generation Function' is a triplet <NODE, FUNCTION,OUTPUTS>, such that: 1) NODE is a node in an instruction tree; 2) FUNCTION is a function which generates length, address and data instances for OUTPUTS. 3) OUTPUTS are a set of length, address and data expression leaves in the sub-tree rooted by Node; Generation functions are used by the generation scheme, while traversing an instruction tree. When a node becomes current all the generation functions associated with it are invoked. The outputs of these functions are used to generate the instances of the current sub-tree. Generation functions serve various purposes:

Modelling Condition Codes (inter-operand verification tasks):

An instruction execution may result in the setting of condition code bits. This effect is part of the instruction's specification and is modelled by the semantic procedure. Moreover, the condition codes partition the input domain of the instruction. As it is a common testing knowledge to use this input partitioning, a generation function may bias the data of operands to exercise all condition codes.

Modelling Program Exceptions (inter-operand):

Program exceptions are exceptional conditions raised by instruction execution. They are modelled by the semantic procedure and may be viewed as input partitioning.

Modelling Procedural Aspects of Resources (inter-instruction):

The resource model as described above is too simplistic for an actual architecture. In particular address translation and cache mechanisms are common in computer architectures. Generation functions are used to incorporate inputs which test these mechanisms into test programs.

Data Type Special Values (within operand):

The domain of (typed) data instances may also be partitioned. Again, it is common to require that representatives of all data-type partitions be tested.

Modelling Design Implementation:

Various aspects of the hardware design are usually taken into consideration in the verification process.

Although these aspects are not considered part of the architecture, their testing is important.

Definition:

A 'Validation Function' is a triplet <NODE,FUNCTION, INPUTS>, such that: 1) NODE is a node in an instruction tree; 2) FUNCTION is a function which reads the length, address and data instances for INPUTS and returns either a Reject or an Accept answer. 3) INPUTS are a set of length, address and data expression leaves in the sub-tree rooted by Node;

Validation functions are used by the generation scheme. After generating a sub-instance-tree, the validation functions associated with the corresponding sub-instruction-tree are invoked. If any of them returns a Reject answer, the generation results of the sub-tree are retracted and the sub-tree is traversed again.

Validation functions serve different purposes:

Imposing restrictions that are not modeled by the length, address and data expressions on instruction instances;

Preventing instruction instances from causing program exceptions;

Validating typed data instances.

Generation and validation functions provide for an open system. The fact that generation functions are allowed to produce only simple data-types, ie length-instance, address-instance, data-instance, enables the user to express his testing knowledge in a natural and local manner. Yet, the ability to generate sets of such instances and to associate functions with instructions, operands and sub-operands gives these functions the desired expressiveness. Had generation functions allowed to create full instruction instances, they would have been too complex to be written by users. Their simplicity allows openness and make it possible to model the evolving testing knowledge.

2. Example

ADD WORD Generation Functions

Figure 6:
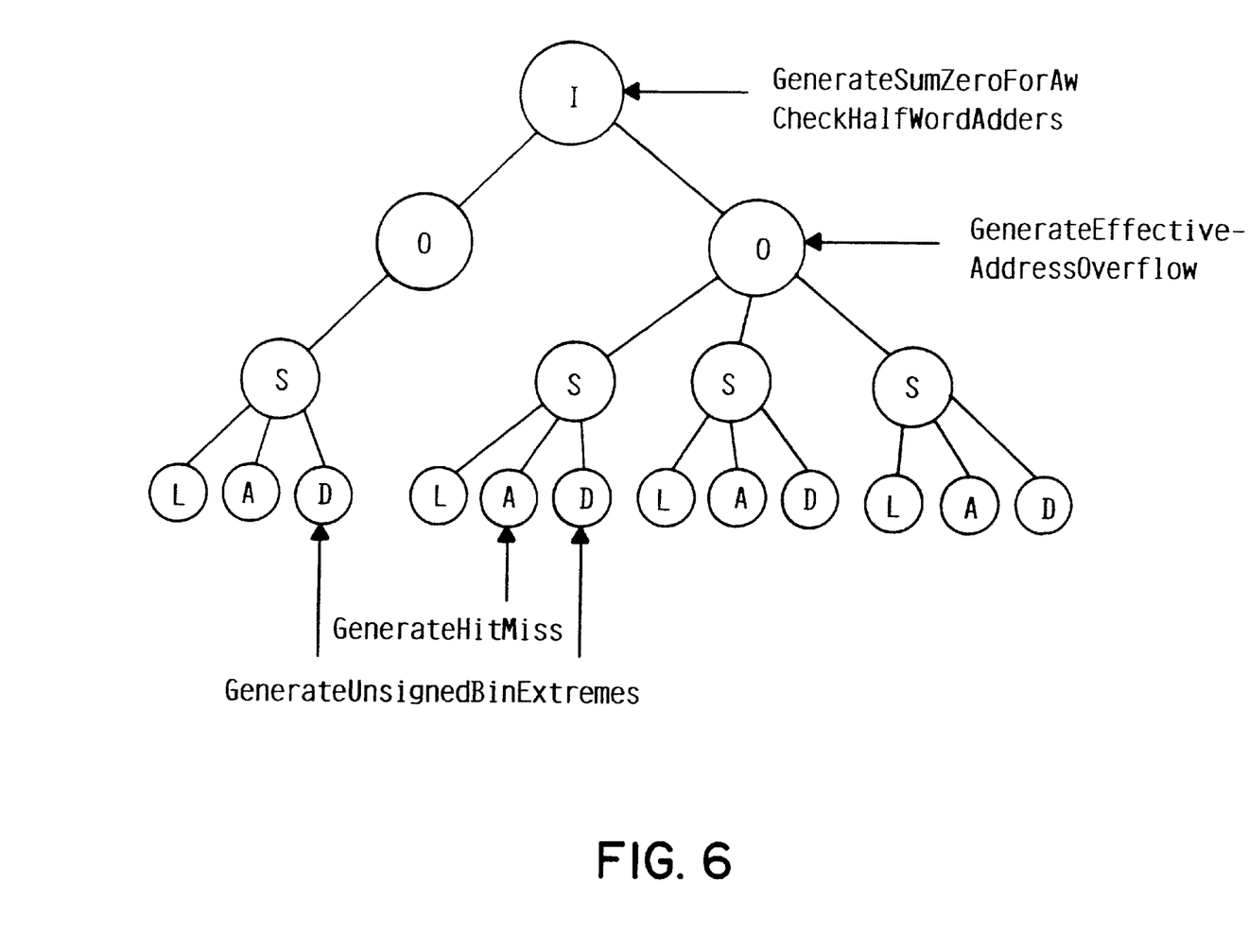
FIG. 6 shows an example of ADD WORD generation functions.

An example of the generation Functions for the ADD WORD instruction are shown in FIG. 6. The ADD WORD instruction tree is augmented with generation functions. This illustrates the various objectives which may be achieved by generation functions:

Modelling Condition Codes;

The execution of Add Word sets the condition code to Sum is zero, Sum is less than zero or Sum is greater than zero. The function Generate Sum Zero for AW is associated with the root of the instruction tree. It generates two data-instances for the appropriate sub-operands, such that their sum is zero. To keep the generation as random as possible, this function generates a random data-instance and its negation is given as the second data-instance. Furthermore, data instances giving near-zero results may also be generated to test that the condition code is not set to Sum is zero inappropriately. Clearly, random generation would have exercised this condition only rarely.

Modelling Program Exceptions;

ADD WORD may cause an Effective Address Overflow exception; this happens when the contents of the base register points to one memory segment, while the address formed by the addition of that register and the displacement points to a different segment. A generation function Generate Effective Address Overflow is associated with the second operand. It generates two data-instances for the appropriate sub-operands which cause an Effective Address Overflow.

Random generation of addresses exercises such an exception quite rarely, and the biasing achieved by this generation function is important in testing the instruction and the program exception mechanism.

Modelling Procedural Aspects of Resources:

An address-instance may either be resident in the cache (hit) or not (miss). Likewise, the address and length instances of a sub-operand instance may render its least-significant byte as either hit or miss. Sub-operand instances which exercise the hit/miss combinations (for their most and least significant bytes) are used to check a memory-cache mechanism. The function Generate Hit Miss includes knowledge about the cache mechanism and is associated with the memory address of the second operand. It generates address and length instances which randomly exercise one of the hit/miss combinations.

Data Type Special Values:

The function 'Generate Unsigned Binary Extremes' is associated with the two unsigned-binary data leaves. It generates data instances, which are selected randomly from the values 0xFFFFFFFF, 0x00000000 and near values.

Modelling Design Information:

A generation function associated with the root may test the carry-look-ahead mechanism. It produces data instances for the unsigned binary leaves that result in different carry patterns on the look-ahead boundaries. For example, in the case of two half-word adders, the data values 0000FFFF and 00000001 exercise the carry passed between the two adders. The function Check Half-Word Adders represents knowledge about the implementation of the Arithmetic and Logic Unit.

3. Generation

Test generation is divided into two procedures: Generate-Test and Generate. The former uses a dynamic process similar to that of RTPG, and the later is an elaboration of a depth-first traversal of an instruction-tree with backtracking.

```
Generate-Test(N)
  Initialize the minimal processor state
  while number of instructions < N
    Select an instruction; denote its model by Instruction-Tree
    GEN: Instance = Generate(Instruction-Tree,Empty)
    Simulate Instance by Instruction-Tree.Semantic- Procedure
  if instruction-instance is executable
    then write it to the test file increment number of instructions else
  retract the instruction-instance; restore the processor's previous state; if
  retry limit not exceeded then go-to GEN else abort return Success
  Generate(Node, Kept-Outputs) invoke generation functions associated with
  Node add their outputs to Kept-Outputs if Node is internal then for each
  of
  the immediate descendants of Node
    invoke Generate(Descendant, Kept-Outputs) if Reject is returned then
  restore Kept-Outputs if retry limit not exceeded then invoke
  Generate(Descendant, Kept-Outputs) else return Reject else return Accept
  else (Node is a leaf): Select one of the Kept-Outputs associated with
  Node.
  if there is no such output then select randomly an instance from the
  semantics of the expression of Node. if the instance does not satisfy the
  expression of Node then return Reject else return Accept Invoke validation
  functions associated with Node. if any of the validation functions returns
  Reject then return Reject else return Accept
```

The resource manager exists in the background of the generation process. It manages the state of the processor which is important for the dynamic Genelate-Test algorithm. It is also important in Generate-Test for resolving address expressions. Generation and validation functions query the resource manager about the allocation and contents of resources. This information is used to select resources and validate the instruction tree expressions.

Results

The embodiment of the invention has been used by the inventors to generate test programs for several processor architectures. Both CISC and RISC architectures have been used, including two versions of the IBM AS/400 CISC processor, a floating point unit of an IBM System/390 processor and three implementations of a RISC processor (IBM, AS/400 and System/390 are trademarks of International Business Machines Corporation). Examples of test programs generated by the embodiment of the invention used by the inventors for CISC and RISC architectures are given in Appendix A, to be found at the end of the description.

The architectures modelled differ by their instructions repertoire and structure, inter-operand relations, resources and functional units. All architectures are complex, consisting of hundreds of instructions, specified in multi-volume architecture books, and require costly and intricate verification. The modelling of the RISC architecture includes over 300 instructions, 40,000 lines of C procedures representing testing knowledge, and resides in a 3 mega-byte data-base. A CISC architecture which was used as a basis for the development of the system, included over 100 instructions, 13,000 lines of testing knowledge code, residing in a 4 mega-byte data-base.

Complex test programs corresponding to the verification tasks described in above have been generated for the architectures modelled. Large tests (hundreds of instruction instances), with large data (thousands of bytes) are generated in seconds. However, the quality of these tests is considered to be more important.

Verification tasks at instruction and operand levels, eg representative data instances, different operand lengths and all program exceptions, are fulfilled through generation functions. Register and memory allocation policies produce complex dependencies between instructions. Using these functions in conjunction with the allocation policies to generate long instruction streams, accomplishes inter-instruction verification tasks.

The testing knowledge model is currently used to specify testing expertise which was previously described informally. Informal test requirements are compiled first; generation functions are then designed and implemented. In this sense, the generation system is used as an expert system. All verification tasks driven from the architecture, and many that represent implementation aspects have been modelled by generation functions. Using this knowledge, a set of tests can be generated which gives a good coverage of the design. In both examples the database serves as a knowledge base capturing the expertise of the organization making it formal and reusable.

Also, testing expertise accumulated during the verification of three different implementations, spanning five years, of the ANSI/IEEE standard for binary floating point arithmetic has been incorporated into the model of the embodiment used by the inventors. It is being used to generate tests for a few current implementations of the same standard.

Although a specific embodiment along with some alternate embodiments have been disclosed, it will be understood by those skilled in the art that additional variations in form and detail may be made within the scope of the following claims.

APPENDIX A

Examples of Test Programs

A.1  A RISC Architecture

* INITIALIZATIONS
| | |
|---|---|
| R IAR | 0000000000200000 |
| R CR | 00000000 |
| R XER | 0000000000000020 |
| R FPSCR | 0000000000000000 |
| R MSR | 00000001 |
| R G18 | 122BC71CEA5C3B2B |
| R G6 | 5A2D606A18536A8B |
| R G1 | 9A639739A5F55A33 |
| D 000000001173B7 | 33CA81E689516DC4 |
| R G15 | 0000000000113D7B |
| R G7 | 5BD24F21A2D94CB6 |
| R G8 | 267F09AF6415A9BD |
| R G20 | 1584B4CD8C3D09E0 |

* INSTRUCTIONS
I 00000000200000 7E460A15 * add. G18,G6,G1
I 00000000200004 48133104 * b 0x133104
I 00000000333108 E8EF363C * ld G7,0x363C(G15)
I 0000000033310C 7E883C36 * srd G8,G20,G7
T 00000000333110

* RESULTS
| | |
|---|---|
| R MSR | 00000001 |
| R IAR | 0000000000333110 |
| R G1 | 9A639739A5F55A33 |
| R G6 | 5A2D606A18536A8B |
| R G7 | 33CA81E689516DC4 |
| R G8 | 0000000000000000 |
| R G15 | 0000000000113D7B |
| R G18 | F490F7A3BE48C4BE |
| R G20 | 1584B4CD8C3D09E0 |
| R FPSCR | 0000000000000000 |
| R XER | 0000000008000020 |
| R CR | 80000000 |
| D 000000001173B7 | 33CA81E689516DC4 |

A.2 A CISC Architecture

* INITIALIZATIONS
| | |
|---|---|
| R A0 | 10000000000000004000000000 |
| R IAR | 00000000 |
| R TSW | 02000000 |

APPENDIX A-continued

Examples of Test Programs

| | |
|---|---|
| D 1000000000000000800000F811 | BBCD8634230DAC615ADB20A9 |
| R A3 | 10000000000000800000958A |
| D 1000000000000000800000530E | BD9C0B |
| R A15 | 10000000000000008000000385 |
| R W10 | 47039CFD |
| R W11 | 70C0E376 |
| R W12 | 2DF087D7 |
| R W14 | 00006C74 |
| R D14 | 7EE3FCD2108643A9 |
| D 100000000000000080000084D4 | C661E4B652DCE0A6 |
| R A7 | 10000000000000008000002787 |

* INSTRUCTIONS
I 100000000000000400000000 781F4F892C236287 * AUC '6287'X('C'X,A3),'4F89'X('3'X,A15)
I 10000000000000040000008 60CBA100     * AUWR W10,W11,W12
I 1000000000000004000000C 6BE0F820     * BR W14
I 1000000000000004000006C74 E6E75D4D   * LD D14, '5D4D'X(A7)
T 1000000000000004000006C78

* RESULTS
| | |
|---|---|
| R W10 | 9EB16B4D |
| R W11 | 70C0E376 |
| R W12 | 2DF087D7 |
| R W14 | 00006C74 |
| R TSW | 02000000 |
| R IAR | 00006C78 |
| R H10 | 6B4D |
| R H11 | E376 |
| R H12 | 87D7 |
| R H14 | 6C74 |
| R D14 | C661E4B652DCE0A6 |
| R B10 | 4D |
| R B11 | 76 |
| R B12 | D7 |
| R B14 | 74 |
| R A0 | 10000000000000004000000000 |
| R A3 | 10000000000000800000958A |
| R A7 | 10000000000000008000002787 |
| R A15 | 10000000000000008000000385 |
| D 1000000000000000800000530E | BD9C0B |
| D 100000000000000080000084D4 | C661E4B652DCE0A6 |
| D 1000000000000000800000F811 | BBCD8634230DAC615B98BCB4 |

What is claimed is:

1. A test program generator for producing test programs for checking the operation of a hardware processor design, said test program generator comprising:

storing means for storing data representing a processor instruction set and resources, said stored data being represented as a separate declarative specification, said separate declarative specification being a representation of relationships between semantic entities associated with each instruction and between said semantic entities and said processor resources;

extracting means for extracting said data from said storage means and for transforming said data into internal data structures; and test program generating means for generating test programs from said internal data structures.

2. The test program generator of claim 1 wherein said separate declarative specification is further organized into a tree structure, a first level of said tree structure comprising syntax describing an instruction and a last level of said tree structure comprising possible values and relations between said semantic entities.

3. The test program generator of claim 2 wherein said generating means further comprises means for generating instances of said instruction and means for traversing said tree structure in a depth first order and generating an instance of each semantic entity in accordance with choices made at previous traversal steps.

4. The test program generator of claim 1 wherein testing knowledge relevant to generation of useful test pro(grams is modelled in said stored data.

5. The test program generator of claim 2 wherein generation functions are incorporated into said separate declarative specification, said generation functions comprising testing knowledge that is relevant to generation of useful test programs.

6. The test program generator of claim 5 wherein said generation functions are tailorable by a user so that desired types of test cases can be generated.

7. The test program generator of claim 5 comprising means for testing generated semantic entity instances in accordance with validation criteria, said generation of said semantic entity instances being repeated if a generated instance does not satisfy said validation criteria.

8. The test program generator of claim 6 comprising means for testing generated semantic entity instances in accordance with validation criteria, said generation of said semantic entity instances being repeated if a generated instance does not satisfy said validation criteria.

9. The test program generator of claim 7 wherein said validation criteria are tailorable by said user to prevent undesired types of test cases from being generated.

10. The test program generator of claim 1 wherein said separate declarative specification is in a database external to said generating means.

11. A method for creating test programs for checking the operation of a hardware processor design, said method comprising the steps of:

storing data representing a processor instruction set and resources in a separate declarative specification, said declarative specification containing relationships between semantic entities associated with each instruction and between said semantic entities and processor resources;

extracting said data from storage; and generating test programs from said extracted data.

12. The method of claim 1 wherein said separate declarative specification is organized in a tree structure, a first level of said tree structure comprising syntax of a instruction and a last level of said tree structure comprising possible values and relations between semantic entities.

13. The method of claim 12 wherein said generation step further comprises the steps of:

generating instances of said instruction;

traversing said tree structure in a depth first order; and generating an instance of each semantic entity according to choices made at previous traversal steps.

14. The method of claim 13 wherein said storing step further comprises the step of storing generation functions.

15. The method of claim 14 and wherein said generating an instance step is performed under control of said generation functions, said generation functions being such that desired types of test cases are generated.

* * * * *

UNITED STATES PATENT AND TRADEMARK OFFICE
CERTIFICATE OF CORRECTION

PATENT NO. : 6,006,028
DATED : Dec. 21, 1999
INVENTOR(S) : Aharon Aharon, Yossi Malka and Yossi Lichtenstein It is certified that error appears in the above-identified patent and that said Letters Patent is hereby corrected as shown below:

Claim 4, Col. 21, Line 2, "pro(grams" should be --programs--.
Claim 12, Col. 22, Line 9, "claim 1" should be --claim 11--.
Claim 12, Col. 22, Line 11, "a" should be --an--.

Signed and Sealed this

Eighth Day of August, 2000

Attest:

Q. TODD DICKINSON

*Attesting Officer*     *Director of Patents and Trademarks*